United States Patent [19]

Kondo et al.

[11] 4,185,175

[45] Jan. 22, 1980

[54] CUSHIONED EXTENSION FOR TELEPHONE EARPIECE

[76] Inventors: Dennis K. Kondo; Michael Colombo, both of 2343 Walu Way, Honolulu, Hi. 96822

[21] Appl. No.: 845,702

[22] Filed: Oct. 26, 1977

[51] Int. Cl.² .............................................. H04R 1/10
[52] U.S. Cl. .............................................. 179/182 R
[58] Field of Search .................... 179/182 R, 178, 184, 179/157, 156 R, 146 R

[56] References Cited

U.S. PATENT DOCUMENTS

| | | | |
|---|---|---|---|
| 1,586,140 | 5/1926 | Bonnette | 179/182 R |
| 2,593,892 | 4/1952 | Kindel | 179/182 R X |
| 2,603,724 | 7/1952 | kettler | 179/182 R |
| 3,231,688 | 1/1966 | Ugartechea | 179/182 R |
| 3,830,987 | 8/1974 | Van Dyke | 179/157 |
| 3,943,572 | 3/1976 | Aileo | 179/156 R X |
| 3,980,842 | 9/1976 | Weisbrich | 179/182 R |
| 4,005,278 | 1/1977 | Gorike | 179/182 R |
| 4,027,117 | 5/1977 | Nakamura | 179/182 R X |

*Primary Examiner*—Thomas W. Brown
*Attorney, Agent, or Firm*—James C. Wray

[57] ABSTRACT

In one embodiment, a cushioned extension for a telephone earpiece has bodies connectable to the male threads on a standard telephone handpiece. In a second embodiment the cushioned extension partially surrounds the handle portion of the handpiece and is anchored thereto by plates overlying the inner portion of the handpiece handle. A cushioned extension for the earpiece of a telephone handset has upper portions which extend outward from the earpiece and which terminate outwardly in a radially extending flap arcuate rim. A cushion having two similar arcuate parts is connected to the outward extension of the body and to the rim in each embodiment. A first part of the cushion overlies the rim for contacting the head of a user in an area surrounding an upper part of the pinna of an ear. The inner cushion part fits within the body extension for resting softly against an earlobe of the user without pressing the earlobe against the user's skull. The cushions are attached to the rim and to the body by micro hook and loop-type fasteners connected to the inner cushion and to the inner surface of the body extension and to the rim and flap of a covering of the outer cushion.

11 Claims, 7 Drawing Figures

CUSHIONED EXTENSION FOR TELEPHONE EARPIECE

BACKGROUND OF THE INVENTION

Telephone receiver ear cushioning devices are well known.

Many of such devices simply surround the earpiece with a cushioned cap so that one may press the earpiece against the outer ear or the pinna portion of the outer ear to seal the outer ear from extraneous sounds and to cushion the outer ear from the hard earpiece.

In most devices, the cushioning device completely surrounds the earpiece so as to space the vibrating diaphragm of the telephone farther from the tympanic membrane of the ear, somewhat attenuating the sound vibrations reaching the tympanic membrane.

Since all ears are not shaped the same, devices which completely surround the earpiece bear against different parts of differently shaped and sized outer ears with differing effects upon the advantages of the cushioning devices.

While the cushions may effectively cushion the hard earpiece from the pinna portion of the outer ear, the cushions continue to press the outer ear against the underlying uneven bones of the skull, causing discomfort to the user.

The present invention has been designed to overcome these and other disadvantages of the prior art devices.

BRIEF SUMMARY OF THE INVENTION

Cushioned extensions for telephone earpieces have bodies which are connectable to a standard handpiece. In one embodiment the bodies have threads which connect to male threads of a standard handset from which the threaded earpiece cap has been removed. In another embodiment the bodies partially surround the handle portions of the handset and are anchored thereto by plates overlying the inner portion of the handset handle.

The bodies have upper portions which extend outward from the earpiece and which terminate outwardly in a radially extending flap arcuate rim.

A cushion having two similar arcuate parts is connected to the outward extension of the body and to the rim. A first part of the cushion overlies the rim for contacting the head of a user in an area surrounding an upper part of an earlobe. The inner cushion part fits within the body extension for resting softly against an earlobe of an user without pressing the earlobe against the user's skull. The cushions are attached to the rim and to the body by micro hook and loop-type fasteners connected to the inner cushion and to the inner surface of the body extension and to the rim and flap of a covering of the outer cushion.

In the preferred embodiment, the cushions are semicircular so that only the upper portion of the ear is surrounded by the outer cushion. This makes the device fit any ear and aids in comfort and hearing improvement without unduly displacing the vibrating diaphragm from the tympanic membrane of the ear. The arcuate cushion shields the most significant sound gathering parts of the outer ear from ambient noise, without requiring pressure upon the ear and without cutting off air circulation around the ear.

The soft cushions which contact the head and ear of a user are easily removed for cleaning or replacing.

One object of the invention is the provision of an earpiece cushioning and sound isolating apparatus which has arcuate cushions for cushioning an ear and shielding a portion of an outer ear from ambient noise.

Another object of the invention is the provision of ear cushioning apparatus for an earpiece of a handset which has separate cushions for engaging a head and for engaging a pinna portion of an outer ear of the user.

A further object of the invention is the provision of an earpiece cushioning apparatus for a telephone having a body having connecting means for connecting the body to the handset and having a peripheral rim extending outward from the body remote from the connecting means for at least partially surrounding an earpiece, cushion means removable from the main body and connectable to the rim.

Another object of the invention is the provision of a telephone earpiece cushion having first and second parts, the first part being relatively larger than the second part, and the first part overlying the rim on the earpiece, with the second part positioned within the earpiece adjacent the rim, whereby the first part rests against the head of a user and surrounds an upper portion of an outer ear, and whereby the second part rests against an upper portion of an outer ear of the user.

The invention has as a further object the provision of an earpiece cushion with a first part comprising a foam cushion having a curvilinear cross section and having an arcuate plan configuration and with a second part having a soft foam rubber piece of curvilinear cross section and arcuate plan configuration.

Another object of the invention is the provision of an earpiece cushion with a first part covered with a leather-like material wherein the leather-like material has a flap fitted beneath an earpiece rim, and further having adhering means on opposed surfaces of the flap and the rim and on an inner surface of an earpiece body adjacent a second part of the cushion and on an opposed surface of the second part of the cushion.

A further object of the invention is the provision of an earpiece cushion fastened to an earpiece body with microhook and loop type fasteners.

Another object of the invention is the provision of an earpiece body with a flat base having holes extending therethrough for permitting passage of sound waves and a cup-like extension extending in one direction from the base and have internal threads therein for receiving external threads of an ear portion of a conventional handset and a second cup-like portion extending in the opposite direction and curvilinearly terminating remote from the base in an outward extending portion, the outward extending portion terminating outwardly a radially extending arcuate rim for receiving a cushion, and a recess in the outward extending portion of the body near the rim for receiving a second part of the cushion.

Another object of the invention is the provision of an earpiece cushion with a body having a shell-like portion for overlying a major portion of a conventional handset in an area thereof adjacent an earpiece, and wherein the shell portion is curvilinearly formed to accept a part of the handset therein, and wherein the fastening means comprises a clamping means at one end of the body for clamping a medial portion of the handset between mouthpiece and earpiece and wherein the body extends outward beyond the earpiece and terminates in an arcuate radially extending rim for receiving the cushioning means.

A further object of the invention is the provision of an earpiece cushion supporting body which surrounds a back of the handpiece between earpiece and mouthpiece with a clamping plate which fits over the handset opposite the body and completes a surrounding of an intermediate portion of the handset and fasteners for connecting the plate to the body.

These and other and further objects and features of the invention are apparent in the disclosure which includes the foregoing and ongoing specification and claims and the drawings.

DETAILED DESCRIPTION OF THE DRAWINGS

Figure 1:
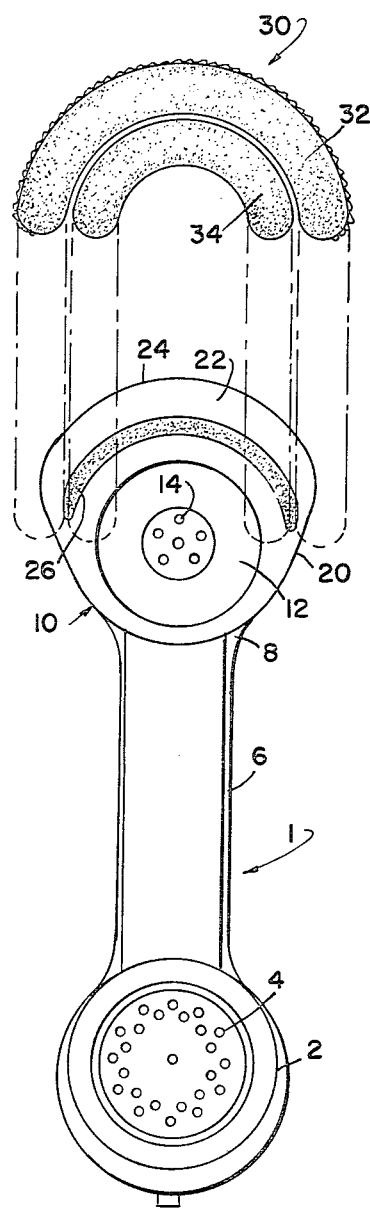
FIG. 1 is an exploded view of a conventional handset on which is mounted an earpiece cushion holding body, from which the cushion has been withdrawn to show details of the body.
Figure 2:
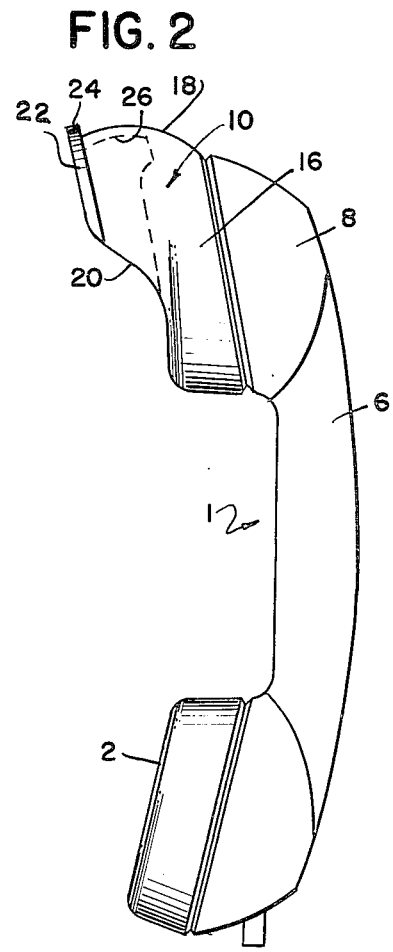
FIG. 2 is a side elevation of the handset shown in FIG. 1 with the cushion attaching body.

Referring to FIG. 1, a telephone handset is generally indicated by the numeral 1. The handset has a mouthpiece 2 which is conventionally a plastic cup-shaped device with plural holes 4 for permitting soundwaves to flow through and impinge upon a diaphragm mounted internally within the handset.

Handles portion 6, connects the mouthpiece 2 and the earpiece 8. It is conventional to cover a vibrating diaphragm within the earpiece 8 with a cap similar to cap 2 but having fewer holes.

The present invention replaces the conventional cap with a threaded cup-like plastic body 10. Body 10 has a base 12 with central holes 14 for passing soundwaves from the vibrating diaphragm within the earpiece 8 to a human ear which is positioned close to the earpiece.

Body 10 has a first sidewall 16 with internal threads which engage conventional external threads on earpiece 8. An outer portion 18 of the body extends away from the base and terminates outwardly in a curvilinear periphery 20. A rim 22 at the outward extension of body 10 extends radially and has an arcuate outer edge 24.

A cushion 30 fits on the body and the cushion has a first outer part 32 and a second inner part 34. Outer part 32 lies on top of rim 22 and inner part 34 of the cushion fits within body 10. The inner surface of body 10 has a recess 26 which receives a part of the other cushion.

Figure 3:
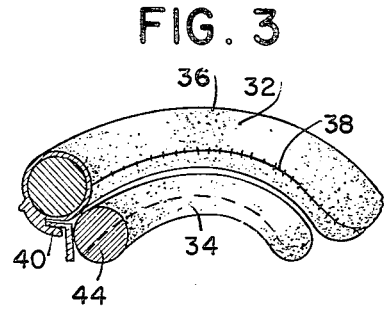
FIG. 3 is a sectional detail of the attachment of the cushion to the body.
Figure 4:
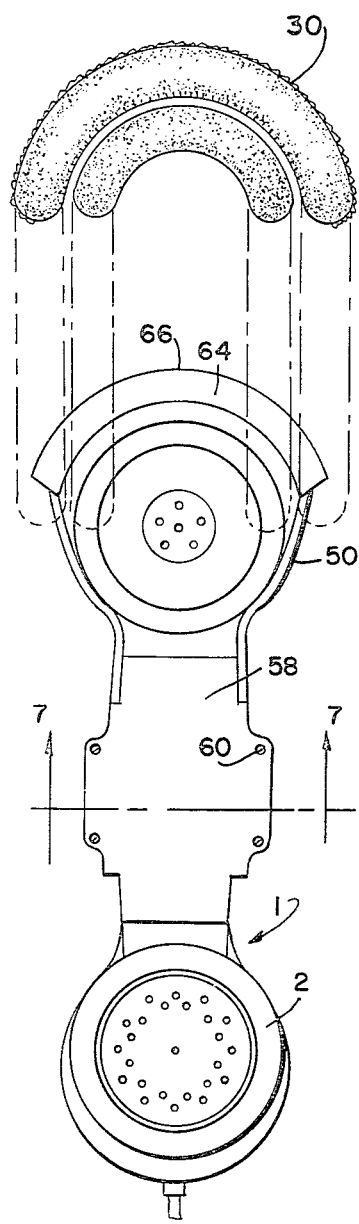
FIG. 4 is an alternate embodiment of the invention in which the cushion receiving body is clamped to a handle of a handset.
Figure 5:
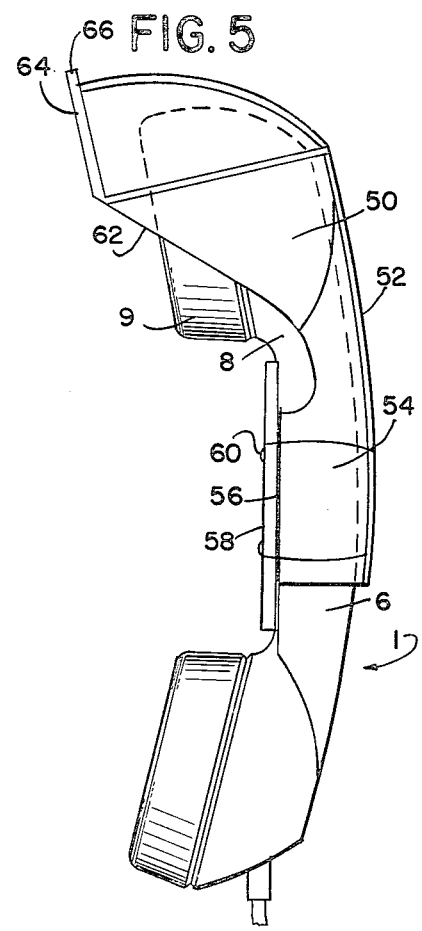
FIG. 5 is a side elevation of the embodiment shown in FIG. 3.

In the preferred embodiment showing FIG. 3, the outer cushion and inner cushion have curvilinear cross-sections which in this case are circular. Inner cushion part 34 is constructed of soft foam rubber and outer cushion 32 is constructed of soft foam and its provided with an outer covering which may be a self-formed skin or which preferably is an imitation leather or leather covering 36, sewn at an inner seam 38. Covering 36 has a flap 40 which extends beneath rim 22 in a preferred embodiment.

In a preferred embodiment the inside of flap 40 and the lower side of rim 22 are covered with self-adhering micro hook and loop type fasteners. Preferably, the inside of recess 26 is provided with micro hook type fasteners which may engage directly in the soft foam of inner cushion 34. Inner cushion 34 may be provided with a strip of micro loop fasteners at a surface of the cushion which is adjacent to the strip of micro hook fasteners 44, which has been bonded to the inside of body 10.

The cushion 30 may be easily removed from the body 10 as shown in FIG. 1 by simply separating the fasteners so that the cushion may be cleaned or replaced.

Flap 40 on the underside of cushion covering 36 provides an arcuate pocket which because of its construction is able to hold the cushion on the rim.

Preferably the two cushion parts are attached together by bonding the second inner cushion 34 to a surface of the coating material 36. Alternatively, the cushion portions may be integrally formed or may be stitched together.

An alternate form of joining the cushion supporting body to handset as shown in FIGS. 4–7.

Handset 1 has a mouthpiece 2 and an earpiece 8 which is covered by a conventional cap 9. Body 50 is a thin-walled plastic structure having reinforcing ribs 52 which receives earpiece 8 and handle 6 of the conventional handset 1. One end 54 of the body 50 terminates in a flat surface 56. A mounting plate 58 overlies flat surface 56 and screws 60 connective mounting plate to the mounting portion 54 of body 50.

The shell of body 50 continues around earpiece 8 and terminates in a curved periphery 62 and outwardly terminates in a rim 64 with an arcuate edge 66. Cushion 30 fits on the rim 64 in the same manner as the cushion fits on the rim 22 as shown in FIG. 3. Complementary surfaces of the cushion, rim and body, are provided with micro hook and loop type fastening strips so that the cushion may be firmly attached to the body and may be easily removed from the body.

Figure 6:
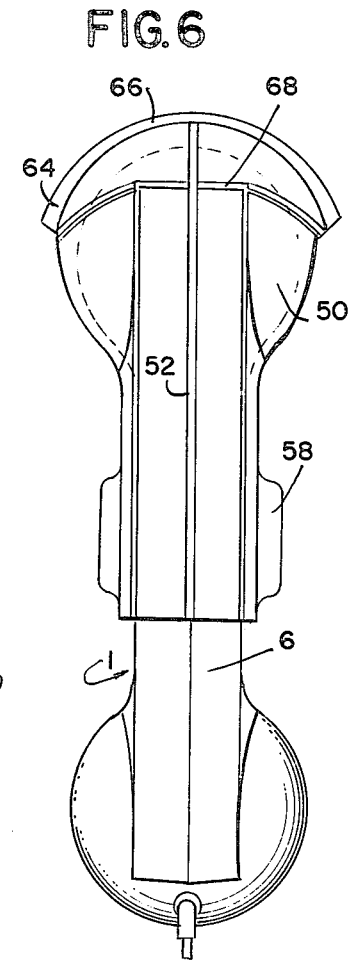
FIG. 6 is a rear elevation of the handset.
Figure 7:
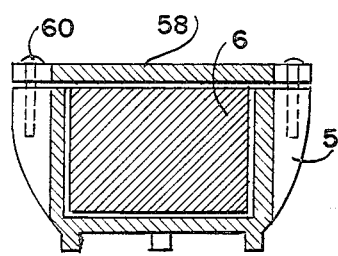
FIG. 7 is a sectional detail of the clamp shown in FIGS. 4–6.

As shown in FIG. 6, the thin-walled plastic shell body 50 is formed with reinforcing ribs 52 which are provided to strengthen the body and to provide nonslip anchoring of the body and telephone handset, such as when the handset is cradled between a shoulder and an ear. The longitudinal ribs 52 provide lateral stability on a shoulder, and transverse rib 68 prevents a telephone from slipping forward on a shoulder.

While the invention has been described with reference to specific embodiments, it will be obvious to those skilled in the art that modifications and variations of the invention may be made without departing from the scope of the invention, which is defined in the following claims.

We claim:

1. Earpiece cushioning apparatus for a telephone comprising mounting means for connection to a telephone handpiece, the mounting means comprising a body having connecting means for connecting the body to the handpiece and having a peripheral rim extending outward from the body remote from the connecting means for at least partially surrounding an earpiece, cushioning means removable from the main body and connectable to the rim, the cushioning means having engaging means for engaging the rim, wherein the cushioning means comprises first and second parts, the first part being relatively larger than the second part, and the first part overlying the rim, with the second part positioned within the body adjacent the rim, whereby the first part rests against the head of a user and surrounds an upper portion of an ear, and whereby the second part rests against an upper portion of an ear of the user.

2. The apparatus of claim 1 wherein the engaging means on the cushioning means comprises a pocket in the cushioning means for receiving the rim.

3. The apparatus of claim 1 wherein the engaging means comprises a flap connected to the cushioning means and wherein the flap has a surface constructed for complementarily engaging a matching surface on the rim.

4. The apparatus of claim 3 wherein the flap and rim have complementary hook and loop engaging surfaces.

5. The apparatus of claim 1 wherein the first part comprises a foam cushion having a curvilinear cross section and having an arcuate plan configuration and wherein the second part comprises a soft foam rubber piece of curvilinear cross section and arcuate plan configuration.

6. The apparatus of claim 5 wherein the first part is covered with a leather-like material and wherein the leather-like material has a flap fitted beneath the rim, and further comprising an adhering means on opposed surfaces of the flap and the rim and on an inner surface of the body adjacent the second part of the cushioning means and on an opposed surface of the second part of the cushioning means.

7. The apparatus of claim 6 wherein the adhering means are microhook and loop type fasteners.

8. The apparatus of claim 1 wherein the body comprises a flat base having holes extending therethrough for permitting passage of sound waves and wherein the fastening means comprises a cup-like extension extending in one direction from the base and having internal threads therein for receiving external threads of an ear portion of a conventional handset and wherein the body further comprises a second cup-like portion extending in the opposite direction and curvilinearly terminating remote from the base in an outward extending portion, the outward extending portion terminating outwardly a radially extending arcuate rim for receiving the cushioning means, further comprising a recess in the outward extending portion of the body near the rim for receiving a part of the cushioning means.

9. The apparatus of claim 1 wherein the body comprises a shell like portion for overlying a major portion of a conventional handpiece in an area thereof adjacent an earpiece, and wherein the shell portion is curvilinearly formed to accept a part of the handpiece therein, and wherein the connecting means comprises a clamping means at one end of the body for clamping a medial portion of the handpiece between mouthpiece and earpiece and wherein the body extends outward beyond the earpiece and terminates in an arcuate radially extending rim for receiving the cushioning means.

10. The apparatus of claim 9 wherein the body is made of a thin plastic shell-like portion having outward extending ribs.

11. The apparatus of claim 9 wherein a portion of the body surrounds a back of the handpiece between earpiece and mouthpiece and wherein the clamping means comprises a plate which fits over the handpiece opposite the body and completes a surrounding of an intermediate portion of the handpiece and fasteners for connecting the plate to the body.

* * * * *